United States Patent
DeHaan et al.

(10) Patent No.: US 8,078,712 B2
(45) Date of Patent: Dec. 13, 2011

(54) SYSTEMS AND METHODS FOR NETWORK COMMAND DELEGATION USING AUTO-DISCOVERED PATHWAYS

(75) Inventors: Michael P. DeHaan, Morrisville, NC (US); Adrian Likins, Raleigh, NC (US); Steven Salevan, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 109 days.

(21) Appl. No.: 12/324,526

(22) Filed: Nov. 26, 2008

(65) Prior Publication Data

US 2010/0131632 A1    May 27, 2010

(51) Int. Cl.
*G06F 15/173* (2006.01)
(52) U.S. Cl. ........ 709/223; 709/203; 709/224; 709/238; 370/238
(58) Field of Classification Search .................. 709/203, 709/220, 223–225; 370/238, 254
See application file for complete search history.

(56) References Cited

U.S. PATENT DOCUMENTS

| | | | | |
|---|---|---|---|---|
| 6,477,572 B1 * | 11/2002 | Elderton et al. | | 709/224 |
| 7,002,917 B1 * | 2/2006 | Saleh | | 370/238 |
| 7,082,460 B2 * | 7/2006 | Hansen et al. | | 709/220 |
| 2002/0099787 A1 * | 7/2002 | Bonner et al. | | 709/220 |
| 2005/0154790 A1 * | 7/2005 | Nagata et al. | | 709/223 |
| 2006/0002309 A1 * | 1/2006 | Ban | | 709/203 |
| 2006/0039340 A1 * | 2/2006 | Ptasinski et al. | | 370/338 |
| 2008/0002588 A1 * | 1/2008 | McCaughan et al. | | 370/238 |
| 2008/0170510 A1 * | 7/2008 | Singh | | 370/254 |
| 2008/0215668 A1 * | 9/2008 | Hu | | 709/202 |
| 2009/0300180 A1 | 12/2009 | DeHaan | | |
| 2010/0223473 A1 | 9/2010 | DeHaan | | |

* cited by examiner

*Primary Examiner* — Ramy M Osman
(74) *Attorney, Agent, or Firm* — Lowenstein Sandler PC

(57) ABSTRACT

Embodiments relate to systems and methods for network command delegation using auto-discovered pathways. A network management server can generate configuration or other commands to transmit to a set of supervisory hosts, which in turn relay the commands to an underlying set of hosts and/or targets. A network map can be maintained specifying pathway(s) to the supervisory hosts and/or underlying hosts and/or targets for delivery of the commands. The pathway(s) can be automatically generated using a discovery tool which probes connections to the supervisory host(s) and/or underlying hosts/targets, and records that information to a network map. The most efficient pathways on a total-hop, transit time or other basis can be identified. A systems administrator at the network management server can issue compact commands that are automatically disseminated to destination hosts/targets over large-scale and geographically diverse networks, without manually specifying pathways. Multiple layers of supervisory hosts can be used.

14 Claims, 5 Drawing Sheets

SYSTEMS AND METHODS FOR NETWORK COMMAND DELEGATION USING AUTO-DISCOVERED PATHWAYS

FIELD

The present teachings relate to systems and methods for network command delegation using auto-discovered pathways, and more particularly to platforms and techniques for generating and managing the delivery of network configuration commands from a central point to supervisory hosts and in turn to lower-level hosts and targets, using automatically discovered pathways.

BACKGROUND OF RELATED ART

A variety of network management platforms exist to assist network administrators with installing and configuring network resources. In many platforms, a management server can be used to issue commands to hosts or other network nodes to manage the configuration of the network hosts, underlying clients or other devices. In the case of comparatively large-scale networks, and/or networks in which nodes are relatively widely dispersed geographically, the distribution of commands can become more problematic. For one thing, the systems administrator may not be aware of the best connection route or pathway through the network to a set of target machines, to most effectively "push" the commands to their destination. For example, certain systems may be reachable only through intermediate systems due to firewall configurations, and multiple levels of firewalls may be in place. For further example, it may be desirable to reduce or minimize the number of network nodes or "hops" that the commands need to traverse to arrive at the intended target machines. For yet further example, in the case of relatively large-scale networks, for example on the order of hundreds or thousands of hosts and/or nodes or more, it may be desirable to transmit the commands as few times as necessary to avoid repetitively transmitting the commands over again each time. It may thus be desirable to provide methods and systems that overcome these network management difficulties, and permit efficient network management over dispersed networks.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for network command delegation using auto-discovered pathways. More particularly, embodiments relate to platforms and techniques for generating and distributing network configuration commands and other data from a central point to a set of supervisory hosts, which can be referred to as a set of "overlord" servers. The set of supervisory hosts can receive the network configuration or other commands, and process those commands to determine a set of lower-level hosts and/or targets associated with the hosts to which the commands will be ultimately transmitted. The set of lower-level hosts and/or targets can comprise comparatively large-scale networks or deployments, on the order for example of ten thousand machines, or less or more machines. According to embodiments in one regard, the network management server can communicate commands to the set of supervisory hosts without having to know the addresses or other network details of the underlying lower-level set of hosts and/or targets, since the supervisory hosts can transmit the commands to appropriate address locations based on a network map or other record of underlying network topology and/or location.

According to various embodiments, the network management server can build and maintain a network map which records the addresses, locations, and other details of the overall network topology. The network map can be generated via an automated discovery process hosted for example in the network management server. In embodiments, the set of supervisory hosts can access the network map to locate hosts and/or targets for configuration commands or other network management activity. According to various embodiments, the network map can encode the most efficient pathways required to reach intended hosts and/or targets, and can be updated to reflect changes to network connections or other resources. These and other embodiments described herein provide a systems administrator or other user with enhanced network management tools and resources, and can for instance allow a systems administrator to issue a compact set of commands that are automatically disseminated to intended destinations using efficient pathways, without a necessity to generate repeated commands for various sets of hosts and/or targets.

Reference will now be made in detail to exemplary embodiments of the present teachings, which are illustrated in the accompanying drawings. Where possible the same reference numbers will be used throughout the drawings to refer to the same or like parts.

Figure 1:
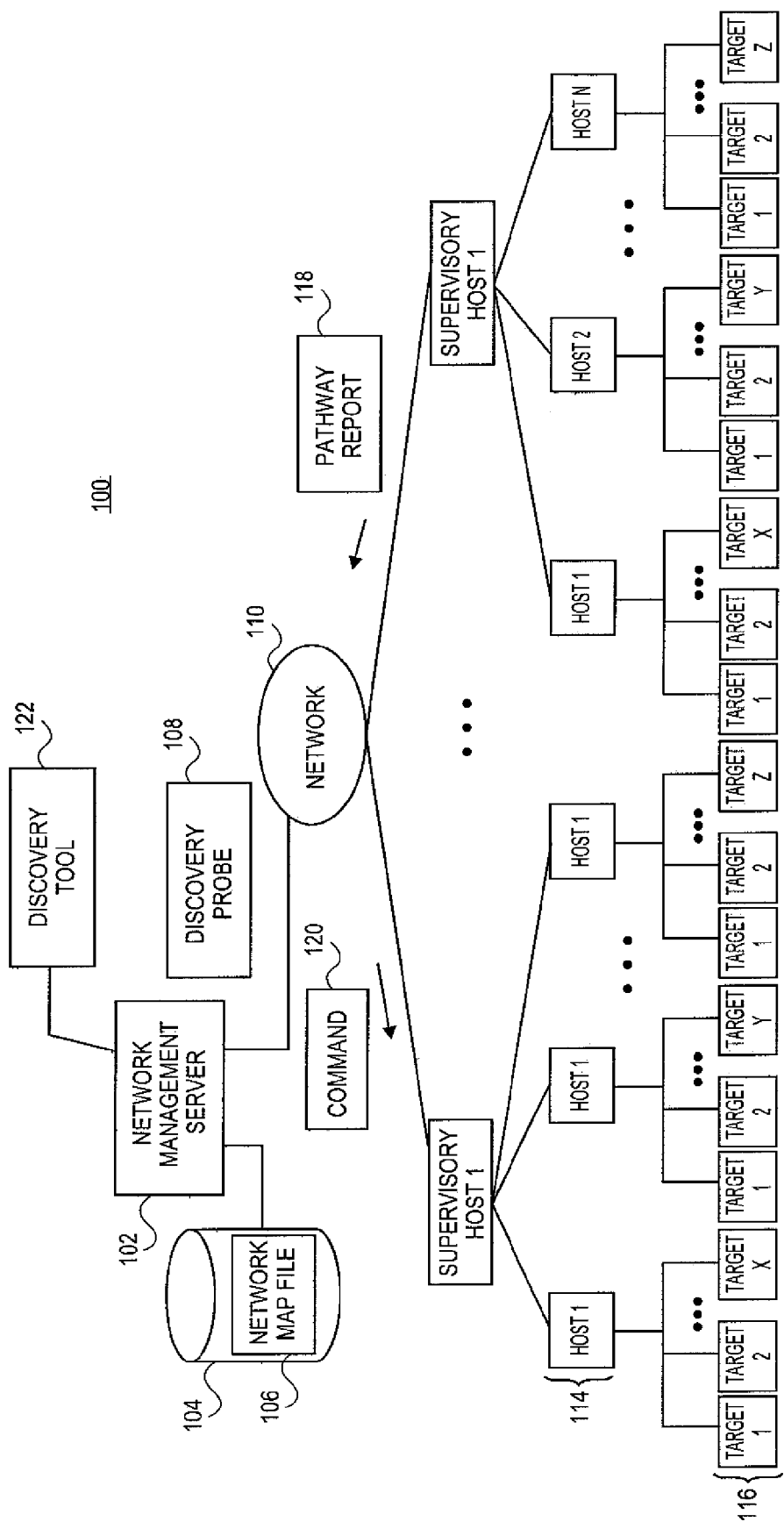
FIG. 1 illustrates an overall system for systems and methods for network command delegation using auto-discovered pathways, according to various embodiments of the present teachings.

FIG. 1 illustrates an overall system 100 consistent with systems and methods for network command delegation using auto-discovered pathways, according to various embodiments of the present teachings. In embodiments as shown, a network management server 102 can communicate with a set of supervisory hosts 112 via one or more networks 110. One or more networks 110 can be or include the Internet, or other public or private networks. One or more networks 110 can be or include wired, wireless, optical, and other network connections. Set of supervisory hosts 112 can be or include a set of servers configured to communicate with a set of hosts 114 at other levels of one or more networks 110 and/or associated connections. In embodiments, set of hosts 114 can be located at a lower level in the hierarchy of one or more networks 110 and/or associated connections than set of supervisory hosts 112. In embodiments, set of supervisory hosts 112 can function as "overlord" hosts or servers which communicate one or more commands 120 to the underlying set of hosts 112.

Set of hosts 114 can in turn support or serve an underlying set of targets 116, for example via a local area network, or other network(s) or connections. Set of targets 116 can be or include a set of personal computers, network-enabled media devices, or other clients, devices, or machines. Other hierarchies, topologies, and connections between network management server 102, set of supervisory hosts 112, set of hosts 114, and/or set of targets 116 can be used. In embodiments, communications between network management server 102, set of supervisory hosts 112, set of hosts 114, and/or set of targets 116 can be conducted via one or more secure channels, such as the secure channel and related resources described in U.S. application Ser. No. 12/130,424, filed May 30, 2008, entitled "Systems and Methods for Remote Management of Networked Systems Using Secure Modular Platform," which published as U.S. Patent Application Publication No. 2009/0300180, assigned or under obligation of assignment to the same entity as this application, and which application is incorporated by reference herein.

Network management server 102 can include or access resources to support the generation and transmission of one or more commands 120 via auto-discovered pathways to manage set of supervisory hosts 112, set of hosts 114, and/or set of targets 116, including a network store 104. Network store 104 can be or include a database or other data store, and in embodiments can store a network map 106. Network map 106 can record information related to the configuration and topology of network connections between set of supervisory hosts 112, set of hosts 114, and/or set of targets 116, as well as other data. In embodiments, network map 106 can be recorded in a file, tree, database, or other record.

According to embodiments in one regard, network management server 102 can build network map 106 in part by issuing one or more discovery probe 108 into one or more network 110 to identify and record available pathways between various hosts, targets, and/or other nodes. The hosts, targets, and/or other nodes may respond to discovery probe 108 with information including pathway report 118 recording nodes, connections, and pathways between set of supervisory hosts 112 and destination machines such as set of hosts 114, set of targets 116, and/or other destinations. Network management server 102 can extract pathway information from pathway report 118 can store that information in network map 106. Network management server 102 can access, or communicate with a discovery tool 122 to permit a systems administrator or other user to view information related to the pathways and connections between set of supervisory hosts 112, set of hosts 114, and/or set of targets 116 that are monitored and managed via network management server 102. In embodiments discovery tool 122 can be or include a browser, or other application or software.

According to embodiments in one regard, network management server 102 can access network map 106 to carry out issue one or more commands 120 via one or more hosts in set of supervisory hosts 112 to underlying hosts, targets, and/or other devices. In embodiments, pathways recorded in network map 106 can identified as most-efficient or best-available pathway(s) to a given destination device. In embodiments, the most-efficient or best-available pathway or pathways may be determined by fewest network hops, lowest expected transit time, and/or other criteria. When network management server 102 generates one or more commands 120, network management server 102 can access network map 106 to identify one or more supervisory hosts in set of supervisory hosts 112 to which to transmit one or more commands 120. The recipient supervisory host(s) can receive one or more commands 120 and, in embodiments, access network map 106 and/or communicate with network management server 102 to extract a most-efficient or best-available pathway by which to relay or transmit one or more commands 120 to underlying devices. The supervisory host(s) can then transmit the one or more commands 120 to a host or hosts in set of hosts 114, and/or to a target or targets in set of targets 116, using the identified pathway.

In embodiments, it will be appreciated that any of network management server 102, set of supervisory hosts 112, set of hosts 114, and/or set of targets 116 can be significantly or substantially geographically distributed, and can represent relatively large-scale groupings or clusters. For instance, different hosts in set of hosts 114 and/or associated targets in set of targets 116 can be located in different metropolitan areas, in different sections of a country, in different countries, or in different continents. For further instance, different hosts in set of hosts 114 and/or sets of targets in set of targets 116 can represent hundreds, thousands, or greater or lesser numbers of collective devices. Even on large-scale deployments, however, according to aspects of the present teachings, network management server 102 can distribute one or more commands 120 using compact data messages to set of supervisory hosts 112 which in turn relay or transmit one or more commands 120 to intended destinations using automatically discovered and optimally routed pathways, relieving network management server 102 of having to make repetitive transmissions to underlying nodes and ensuring more efficient command throughput.

Figure 2:
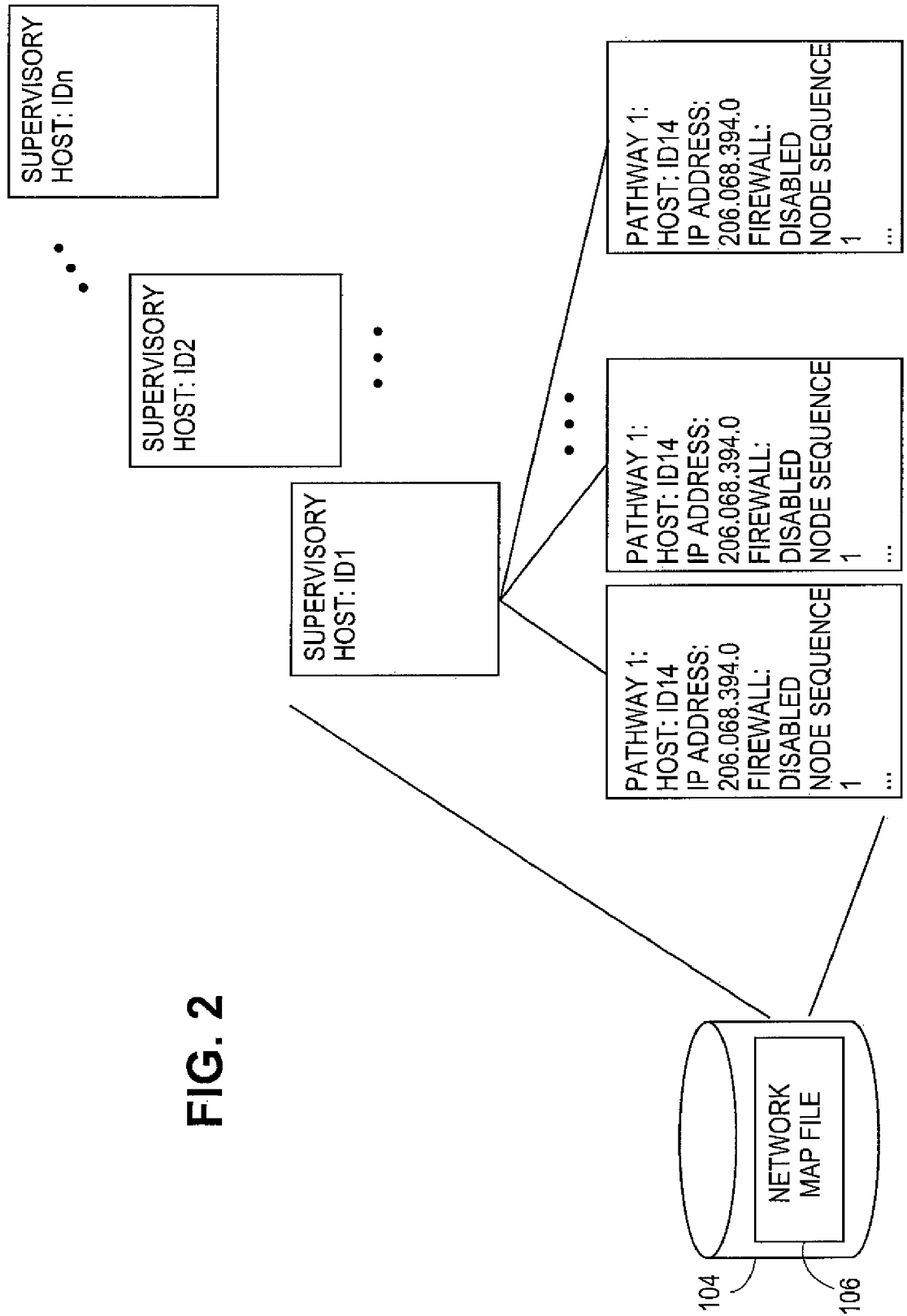
FIG. 2 illustrates an exemplary network configuration map file and associated logic, according to various embodiments.

FIG. 2 illustrates an exemplary configuration of the contents of network map 106, according to various embodiments. In embodiments as shown, network map 106 can contain records representing the set of supervisory hosts 112 and/or one or more of the set of hosts 114 associated with or controlled by a corresponding supervisory host, as well as information related to any one or more of set of targets 116 associated with each host. In embodiments, network map can record a node sequence, for example, identified by a set of Internet Protocol (IP) addresses or other address or identifiers, indicating a pathway or route to a specific host, target, or other machine or device. In embodiments, a given host, target, or other machine or device can have more than one associated pathway. In embodiments, the pathway or pathways recorded for a given host, target, or other machine or device can represent a most-efficient pathway to reach that device based on, for instance, the number of network node hops, an expected transit time, or other criteria.

Figure 3:
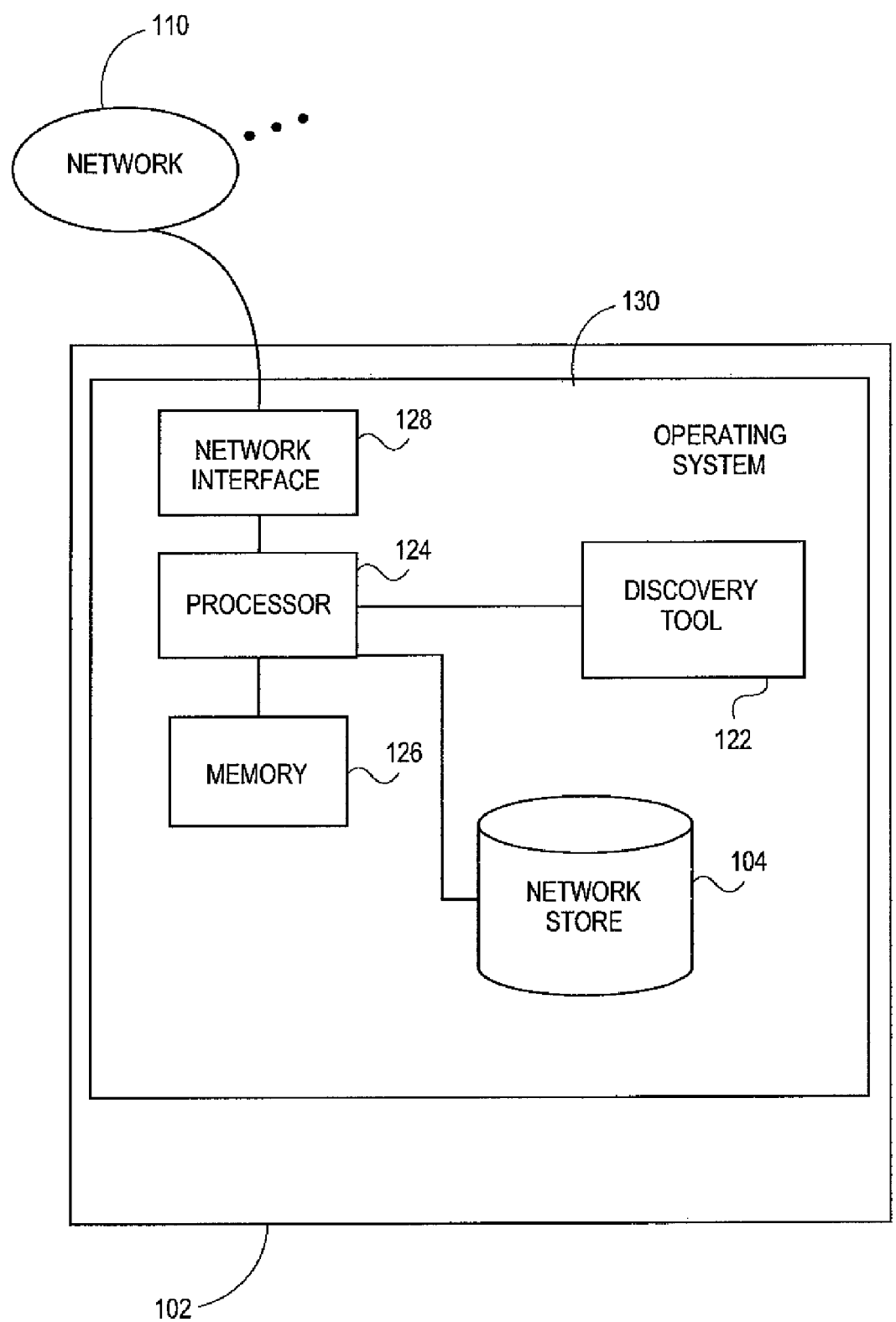
FIG. 3 illustrates an exemplary hardware configuration of a network management server that can be used in systems and methods for network command delegation using auto-discovered pathways, according to various embodiments.

FIG. 3 illustrates an exemplary diagram of hardware and other resources that can be incorporated in a network management system 102 configured to communicate with set of supervisory hosts 112, set of hosts 114, and/or set of targets 116 via one or more networks 110, according to embodiments. In embodiments as shown, network management system 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with discovery tool 122, such as a Web browser or other application, which can be configured to send and receive network topology and other data, to build network map 106. Network management server 102 can permit a user to view, delegate, and execute configuration operations in set of supervisory hosts 112, set of hosts 114, and/or set of targets 116. Other configurations of network management system 102, associated network connections, and other hardware and software resources are possible.

According to various embodiments, as noted above, the delegation of one or more commands 120 can operate by using network map 106, which can be generated by a function such as "build-map" function which probes through network topology of one or more networks 110 and discovers every minion and overlord present that can be connected to. The delegation feature then uses this map data to discover pathways through one or more networks 110. Network management server 102 can employ script that builds a map tree, and saves it in a file, such as /var/lib/func/map. Run without arguments, a build-map function will rewrite any mapfile currently sitting in /var/lib/func. Other options can change the script's behavior:

-a, --append: probes through network and appends new data to existing mapfile instead of rewriting it
-o. --onlyalive: builds map using test.ping( ) method, returning a map that contains only boxes that return a ping It may be noted that minions not yet in the network map 106 will not be reached by delegation calls. The following code illustrates command delegation via the Python API:
import func.overlord.client as fc
my_overlord=fc.Overlord("<webservers*example.org>", delegate=True)

To use an alternative delegation map file, the argument mapfile=<your mapfile location> can be added to pull the mapping data out of that source, instead. From this point, the delegating overlord object can be treated in the same manner as a non-delegating overload. Minions that exist under multiple layers of overlords will appear as if they exist directly beneath a master overlord (e.g., network management server 102).

Figure 4:
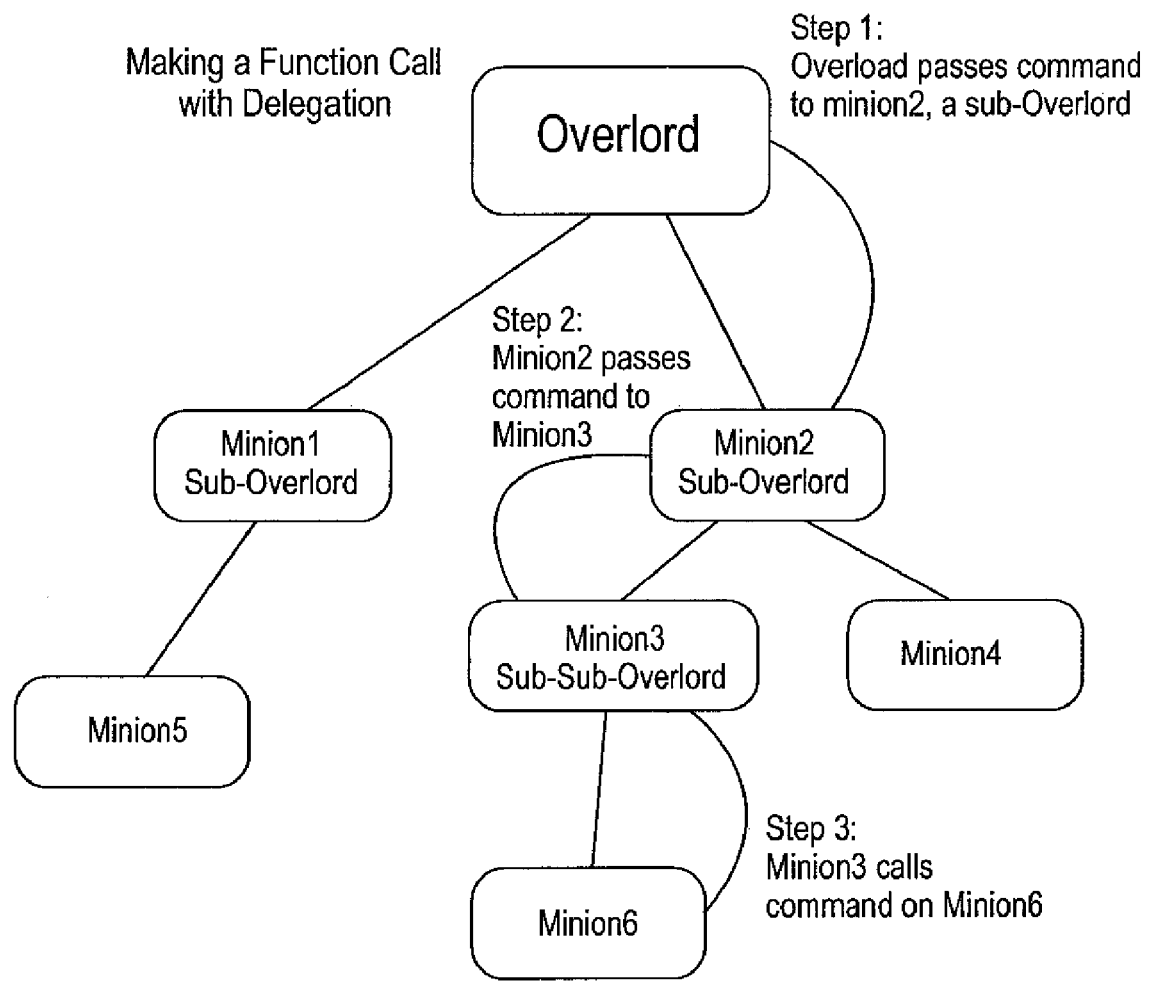
FIG. 4 illustrates exemplary command delegation activity, according to various embodiments.

FIG. 4 illustrates an exemplary transmission of one or more commands 120 to underlying network nodes, according to various embodiments. In embodiments as shown, implementing code can for instance be or include:
import func.overlord.client as fc
minion6=fc.Overlord("Minion6", delegate=True)
minion6.test.ping( )
and the results:
{'Minion6':1}

When one instantiates an overlord Client object (contained within the client.py code) e.g. in the manner described above, the network map 106 (which can be stored in yaml format) can be read and converted into a Python dictionary object. When a function call is made against this Client object, the glob provided is matched against the elements in the tree and the shortest 'call paths' through the tree to each match are found. In this case, the shortest call path to Minion6 can be:
['Minion2', 'Minion3', 'Minion6']

The Client code then checks the length of each call path list. If a call path contains only one element, it can be determined that it exists directly under the current overlord, and the function call can be made as without delegation. Otherwise, the delegation module can be called and will call its run( ) method on Minion2. The module, method, and arguments specified by the user can be passed to the run( ) method, along with a new call path with 'Minion2' stripped off. The run( ) method, seeing that the call path it was passed contains multiple elements, calls the delegation.run( ) method on Minion3, passing along the module, method, and arguments, and a new call path with 'Minion3' stripped off. Minion3's run( ) method, seeing that the call path contains a single element, calls the module and method on Minion6 and passes it the user-supplied arguments. The return data from Minion6 is passed back to Minion3, which pulls the Minion6 data out of the results hash and then passes back to Minion2, which does the same, and finally passed to the central overlord, which inserts the results data into the master results hash. Other configurations, code, and logic can be used.

Figure 5:
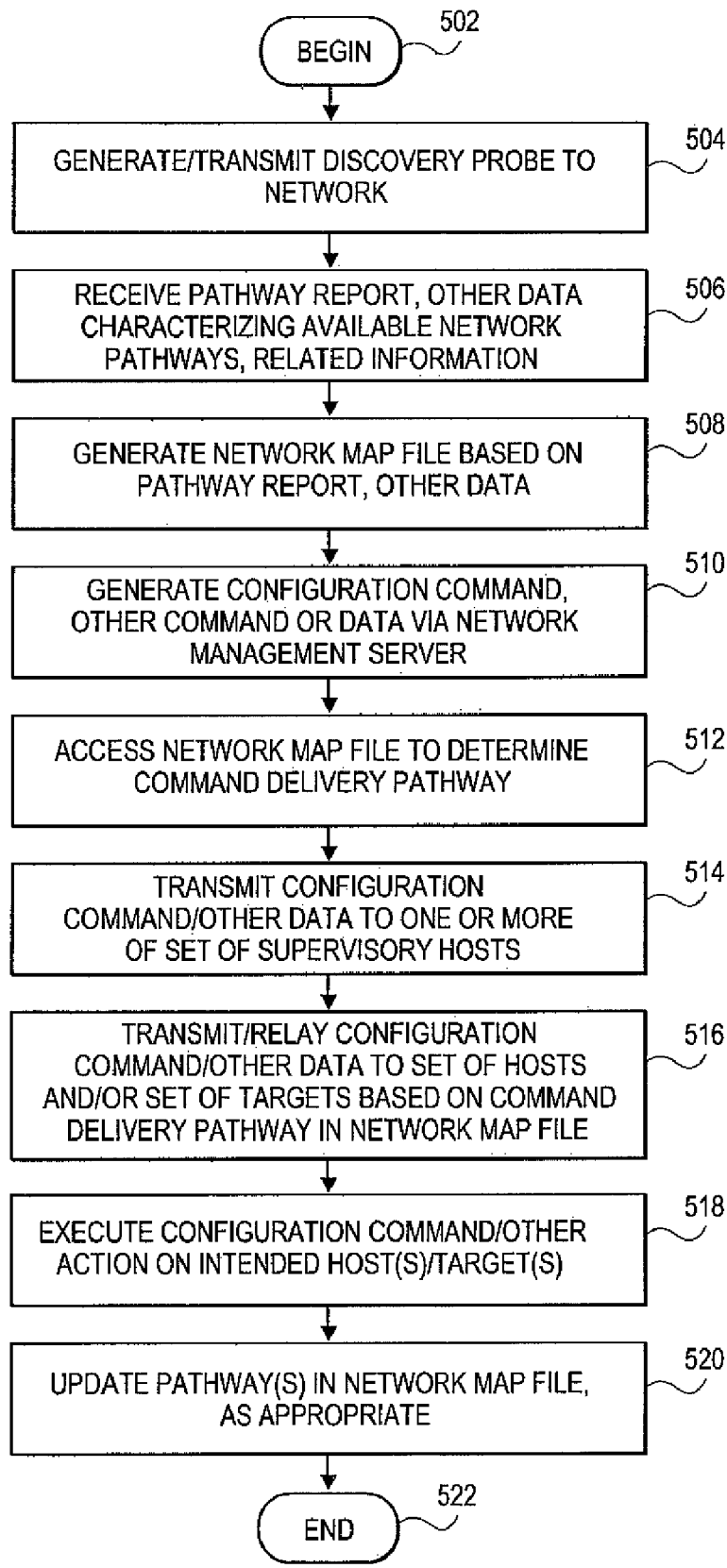
FIG. 5 illustrates overall network management processing for systems and methods for network command delegation using auto-discovered pathways, according to various embodiments.

FIG. 5 illustrates overall processing for network command delegation using auto-discovered pathways, according to various embodiments of the present teachings. In 502, processing can begin. In 504, a discovery probe 108 can be generate and transmitted to various destinations in network 100 to locate available pathways to set of supervisory hosts 112, set of hosts 114, set of targets 116, and/or other devices, resources, addresses, or other sites. According to various embodiments, the discovery probe 108 can be generated and transmitted via network management server 102, and/or can be generated and transmitted from other sources.

In 506, network management server 102 can receive a pathway report 118 and/or other data characterizing available network pathways to various supervisory hosts, non-supervisory hosts, targets, and/or other destinations. In embodiments, pathway report 118 can contain an indication of a most efficient pathway to a given device or destination. In embodiments, a most efficient pathway can be identified by a pathway or connection containing the few network hops or nodes. In embodiments, a most efficient pathway can be identified by a short expected transit time to a device or other destination. In embodiments, other criteria can be used to identify a most efficient pathway, or other optimized or alternative pathways or connections.

In 508, a network map 106 or other representation of the topology or connection pathways available in network 100 can be generated by network management server 102 based on one or more pathway report 118, and/or other data. In 510, a one or more commands 120 or other command or data can be generated via network management server 102 and/or other logic for transmission to the network 100. One or more commands 120 can specify, for example, the configuration, settings, or other attributes of hardware, software, operating system, network, input/output, and/or other resources of any of set of supervisory hosts 112, server of hosts 114, set of targets 116, and/or other devices or destinations. In 512, network management server 102 or other logic can access network map 106 to determine a command delivery pathway to intended supervisory hosts, non-supervisory hosts, targets, or other devices. In embodiments, the delivery pathway can be or include a most efficient or optimized pathway to the eventual target device(s). In embodiments, the eventual target device(s) can be substantially geographically distributed apart from each other, from network management server 102, set of supervisory hosts 112, and/or other network nodes or elements.

In 514, the configuration command 106 and/or other data can be transmitted from network management server 102 to one or more hosts in the set of supervisory hosts 112. In 516, configuration command 106 and/or other data can be transmitted or relayed from the selected host(s) in set of supervisory hosts 112 to any one or more specified devices in set of hosts 114 and/or set of targets 116. In 518, the configuration command 106 and/or other instruction or data can be read, executed, and/or performed on the intended host(s)/target(s), for example, to carry out instructions to modify a hardware, software, network, input/output or other setting of that device or resource. In embodiments, configuration command 106 can for instance initiate the installation of new or updated applications or other software. In 520, the recorded delivery pathway(s) in network map 106 can be updated, as appropriate. In 522, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which configuration commands or other data are generated and transmitted from one network management server 102, in embodiments more than one server or other device or resource can serve as a control point. For further example, while embodiments have been described in which a set of supervisory hosts 112 coordinate the distribution of commands and data to a set of hosts 114 each of which in turn serve or support a set of targets, in embodiments, implementations can involve the dissemination of commands or other data through different network hierarchies, trees, nodes, or arrangements. For instance, in embodiments, commands or other data can be delegated via supervisory hosts through more than two sub-levels. For yet further example, while embodiments have been described involving one level or layer of supervisory hosts, in embodiments, the overall network can be configured with multiple levels or layers of supervisory hosts (overlords). Similarly, various targets in set of targets 116 can be configured at different levels within the overall network. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of distributing a network command, comprising:
    receiving, by a network management server, a report from a set of destination devices, wherein the report comprises a set of pathways to the set of destination devices, wherein each pathway of the set of pathways comprises at least one of a pathway containing a least amount of node hops to a respective destination device or a pathway representing a lowest estimated data transmit time to the respective destination device;
    generating, based on the report, a network map comprising a set of indications of the set of pathways;
    generating a network command to transmit to the set of destination devices;
    examining the network map to determine the set of pathways to the set of destination devices on which to transmit the network command;
    transmitting the network command to at least one supervisory host; and
    relaying, from the at least one supervisory host to the set of destination devices, the network command via the set of pathways.

2. The method of claim 1, wherein the set of destination devices comprises at least one of a set of hosts and a set of targets.

3. The method of claim 1, wherein the network command comprises a set of network commands.

4. The method of claim 1, wherein the network command is minimized for the relaying from the at least one supervisory host to the set of destination devices.

5. The method of claim 1, wherein at least two of the network management server, the at least one supervisory host, and the set of destination devices are geographically separated.

6. A network management system, comprising:
    an interface to at least one supervisory host communicating with a set of destination devices; and
    a network management server, communicating via the interface with the at least one supervisory host, the network management server being configured to—
        receive a report from the set of destination devices, wherein the report comprises a set of pathways to the set of destination devices, wherein each pathway of the set of pathways comprises at least one of a pathway containing a least amount of node hops to a respective destination device or a pathway representing a lowest estimated data transmit time to the respective destination device;
        generating, based on the report, a network map comprising a set of indications of the set of pathways;
        generate a network command to transmit the set of destination devices;
        examine the network map to determine the set of pathways to the set of destination devices on which to transmit the network command;
        transmit the network command to the at least one supervisory host; and
        relay, from the at least one supervisory host to the set of destination devices, the network command via the set of pathways.

7. The system of claim 6, wherein the set of destination devices comprises at least one of a set of hosts and a set of targets.

8. The system of claim 6, wherein the network command comprises a set of network commands.

9. The system of claim 6, wherein the network command is minimized for the relaying from the at least one supervisory host to the set of destination devices.

10. The system of claim 6, wherein at least two of the network management server, the at least one supervisory host, and the set of destination devices are geographically separated.

11. A network command, the network command being generated by a method comprising:
    receiving, by a network management server, a report from a set of destination devices, wherein the report comprises a set of pathways to the set of destination devices, wherein each pathway of the set of pathways comprises at least one of a pathway containing a least amount of node hops to a respective destination device or a pathway representing a lowest estimated data transmit time to the respective destination device;
    generating, based on the report, a network map comprising a set of indications of the set of pathways;
    generating the network command to transmit to the set of destination devices;
    examining the network map to determine the set of pathways to the set of destination devices on which to transmit the network command;
    transmitting the network command to at least one supervisory host; and
    relaying, from the at least one supervisory host to the set of destination devices, the network command via the set of pathways.

12. The network command of claim 11, wherein the set of destination devices comprises at least one of a set of hosts and a set of targets.

13. The network command of claim 11, wherein the network command comprises a set of network commands.

14. The network command of claim 11, wherein the network command is minimized for the relaying from the at least one supervisory host to the set of destination devices.

* * * * *